(No Model.)
G. C. WARD.
COTTON SEED PLANTER.
No. 273,647. Patented Mar. 6, 1883.
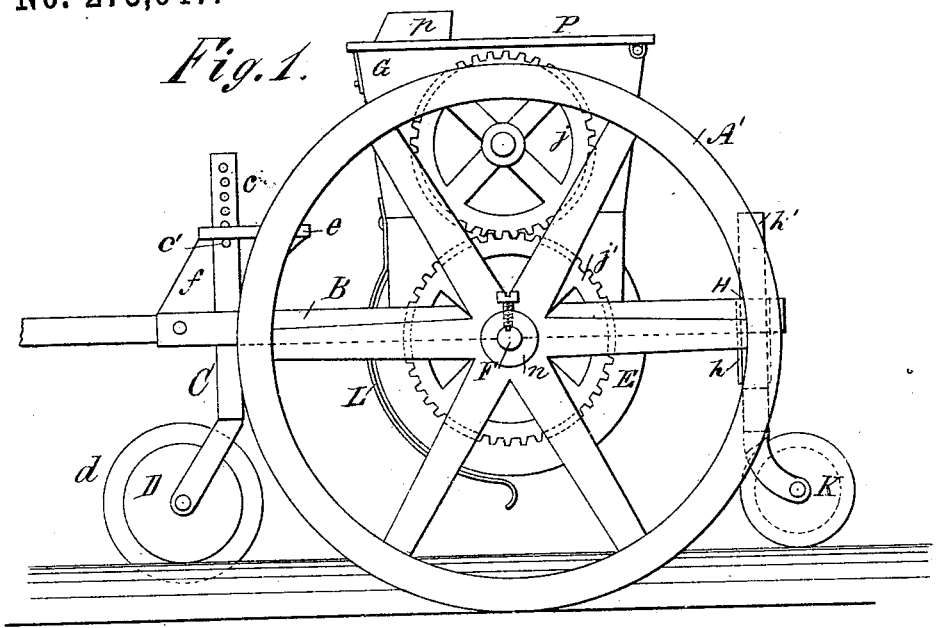
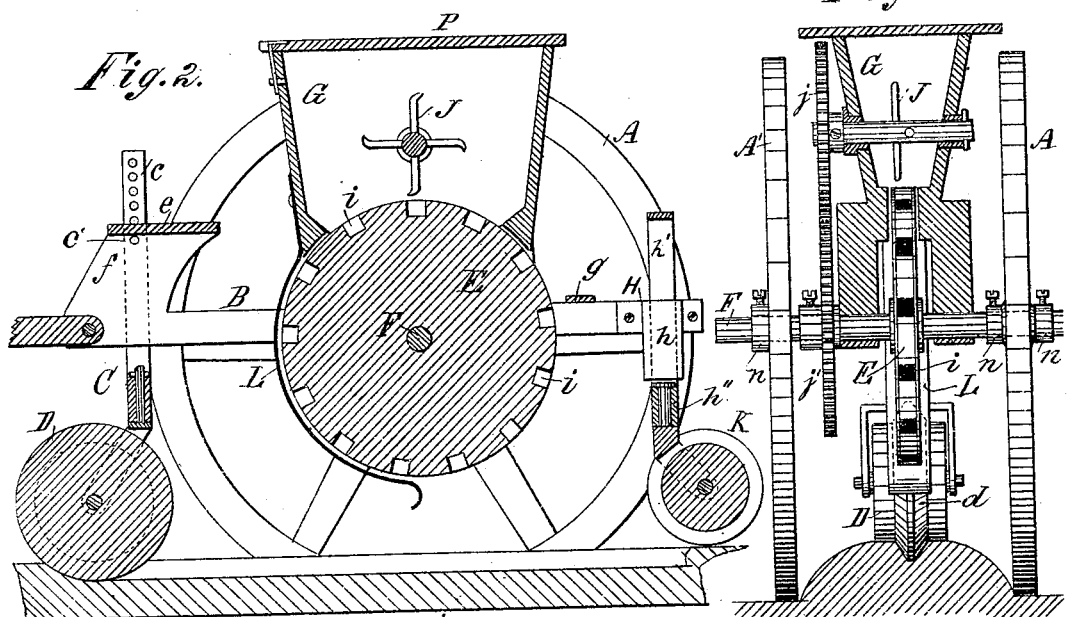
WITNESSES:
Theo. J. Hoster
C. Sedgwick
INVENTOR:
G. C. Ward
BY Munn & Co
ATTORNEYS.

UNITED STATES PATENT OFFICE.

GEORGE C. WARD, OF GIRARD, KANSAS.

COTTON-SEED PLANTER.

SPECIFICATION forming part of Letters Patent No. 273,647, dated March 6, 1883.

Application filed May 25, 1881. (No model.)

*To all whom it may concern:*

Be it known that I, GEORGE C. WARD, of Girard, in the county of Crawford and State of Kansas, have invented certain useful Improvements in Cotton-Seed Planters, of which the following is a specification.

The object of my invention is the production of an efficient, reliable, and easily-operated cotton-seed planter or drill.

In the accompanying drawings, Figure 1 is a side elevation of my improved planter. Fig. 2 is a central vertical longitudinal section. Fig. 3 is a rear elevation, with the hopper shown in vertical central section; and Figs. 4 and 5 are detail views of the dropping-wheel.

Similar letters of reference indicate corresponding parts.

I have shown in the drawings my improved drill or planter arranged to plant in ridges; but it may be arranged, if desired, to plant in ground that is level by adjusting the frame C, in which the wheel D, which forms the gutter, is swiveled downwardly, so that the circumferential ridge *d* of this wheel will be on a level, or nearly so, with the main wheels A A′ of the planter. This frame C is adjustable by means of a rod or pin, *c′*, which passes through holes in the arms *c c* of the frame, and through corresponding holes in the uprights *f f*, which uprights are on the forward ends of the horizontal side bars, B B, of the main frame. The foot-rest *e*, secured to the top of these uprights, is slotted to receive the arms *c c*, and it serves to tie the forward ends of the said side pieces together. The rear ends of the side pieces, B B, are tied together by the cross bar or plate *g*, and to the rear ends of these bars B B are secured the vertical sleeves *h h*, in which are placed the side pieces, *h′ h′*, of the vertically-movable frame H. In the center of the lower cross-piece, *h″*, of the frame H is swiveled the covering-roller K, which is concave on its periphery, and serves to gather the dirt back into the gutter formed by the wheel D and cover the seeds, which are delivered regularly by the dropping-wheel E into the gutter. The frame H being movable, the covering-wheel K, which is preferably of solid metal, accommodates itself to all irregularities of the ground, and thus causes all of the seeds to be properly covered. The dropping-wheel E is secured to the center of the axle F and revolves in the bottom of the hopper G. Within the hopper, and a short distance above the chambers or pockets *i i*, formed in the periphery of the dropping-wheel, is placed the beater J, which is caused to rapidly revolve by the cog-wheel *j*, which is secured upon the shaft of the beater outside the hopper, and meshes with the cog-wheel *j′*, secured to the axle or main shaft F. This beater serves to divide the seeds from the mass, and causes them to drop into the pockets *i i* of the dropping-wheel. The seeds are held in the pockets of the dropping-wheel, as the wheel revolves until each pocket comes nearly to a vertical line under the main shaft, by the curved metal plate L, which is secured at its upper end to the front of the hopper G, and the seeds are then dropped into the gutter. Ordinarily the dropping-wheel will be constructed to drop the seeds about six inches apart along the row; but in order to vary the rapidity of dropping I provide the periphery of the wheel with the sliding covers *l l*, which are slotted and move upon screws, for closing some of the pockets when desired, as shown in Figs. 4 and 5. The main axle or shaft F is extended at each side of the planter, as shown in Fig. 3, and the wheel A is rigidly secured to it, while the wheel A′ is loose upon the shaft, thus enabling the planter to be turned around within very small space, and the wheels A A′ are adjustable to or from each other upon the shaft by means of the collars *n n*, thus adapting the planter to plant in different widths of rows.

Upon the cover P of the hopper is formed the seat *p*, so that the person using the planter may ride, if desired.

I am aware that a furrow-opening wheel having a circumferential ridge has heretofore been employed; and I am also aware that a furrow-opening wheel having a wedge-shaped periphery has been arranged in front and a concave covering-wheel in the rear of the hopper and in line with each other; and I am further aware that wedge-shaped furrow-openers having a wheel journaled in their forward ends and adjustably suspended from the frame in front of the hopper by screws having crank-handles and a covering-roller journaled in a sliding frame at the rear of the hopper are old; and I am also further aware that the cups of seed-dropping wheels have been provided with screws in their bottoms for increasing or diminishing their size, and that seed-dropping disks have been provided with adjustable cut-offs for regulating the quantity of seed to be dropped, and I therefore do not claim such inventions.

Having thus described my invention, I claim as new and desire to secure by Letters Patent—

1. In a cotton-seed planter, the combination, with the side bars, B, of the main frame, of the perforated uprights $f f_1$ secured to said frame, the slotted foot-rest $e$, secured to the upper ends of the said uprights, the frame C, provided with the perforated arms $c$, the furrow-opening wheel D, swiveled in the lower end of the said frame, and the rod or pin $c'$, substantially as herein shown and described, whereby the foot-rest is made to serve the double purpose of a foot-rest and means for adjusting the furrow-opening wheel, as set forth.

2. In a cotton-seed planter, the combination, with the supporting-wheels A A', the side bars, B, the adjustable furrow-opening wheel D, and the seed-dropping wheel E, secured to the axle of the said wheels, of the sleeves $h$, secured to the rear end of the side bars, the frame H $h'$ $h''$, sliding in the said sleeves, and the covering-wheel K, swiveled in the lower part of the said frame H $h'$ $h''$, substantially as and for the purpose set forth.

3. In a cotton-seed planter, the combination, with the seed-dropping wheel E, provided with pockets $i$ on its periphery, of the slotted covering-plates $l$, secured to the periphery of the wheel, between the pockets, by screws, substantially as herein shown and described, whereby provision is made for closing some of the pockets of the said wheel, for regulating the dropping of the seed at any desired distance apart, as set forth.

GEORGE C. WARD.

Witnesses:
D. B. VAN SYCKEL,
WM. A. KENDALL.